United States Patent
Degani et al.

(10) Patent No.: US 6,484,631 B2
(45) Date of Patent: Nov. 26, 2002

(54) METHOD AND SYSTEM OF INDIVIDUALIZING TONE-REPRODUCTION CURVES CALIBRATION AND APPLYING THEREOF

(75) Inventors: Ammar T. Degani, Rochester, NY (US); Todd R. Henderson, Conesus, NY (US)

(73) Assignee: Xerox Corporation, Stamford, CT (US)

( * ) Notice: Subject to any disclaimer, the term of this patent is extended or adjusted under 35 U.S.C. 154(b) by 193 days.

(21) Appl. No.: 09/750,571

(22) Filed: Dec. 28, 2000

(65) Prior Publication Data

US 2002/0083852 A1 Jul. 4, 2002

(51) Int. Cl.⁷ .............................. B41F 1/10; B41F 1/54
(52) U.S. Cl. .......................... 101/171; 101/484; 400/74
(58) Field of Search .................................. 101/171, 484, 101/483; 400/74, 70, 76, 61; 358/1.9; 382/254

(56) References Cited

U.S. PATENT DOCUMENTS

| | | | | |
|---|---|---|---|---|
| 5,363,318 A | * | 11/1994 | McCauley | 358/512 |
| 5,537,516 A | * | 7/1996 | Sherman et al. | 358/1.1 |
| 5,589,954 A | * | 12/1996 | Watanabe | 358/518 |
| 5,696,889 A | * | 12/1997 | Morikawa | 358/1.9 |
| 5,726,771 A | * | 3/1998 | Gann et al. | 358/445 |
| 5,777,656 A | * | 7/1998 | Henderson | 347/251 |
| 5,781,206 A | * | 7/1998 | Edge | 347/115 |
| 6,067,406 A | * | 5/2000 | Van Hoof et al. | 358/1.13 |
| 6,229,624 B1 | * | 5/2001 | Gilman et al. | 345/589 |
| 6,291,829 B1 | * | 9/2001 | Allen et al. | 250/559.07 |
| 6,345,128 B1 | * | 2/2002 | Stokes | 382/100 |

* cited by examiner

Primary Examiner—Andrew H. Hirshfeld
Assistant Examiner—Charles H. Nolan, Jr.
(74) Attorney, Agent, or Firm—Fay, Sharpe, Fagan, Minnich & McKee, LLP

(57) ABSTRACT

A method and system updates individualized calibrated tone-reproduction curves. A plurality of predetermined stored calibrated tone-reproduction curves are used, each predetermined stored calibrated tone-reproduction curve corresponding to a distinct media type and halftone type combination along with a plurality of predetermined relationships between each stored calibrated tone-reproduction curve and a reference media type and reference halftone type combination. A new tone-reproduction curve corresponding to a reference media type and reference halftone type combination calibration operation is generated, and each predetermined stored calibrated tone-reproduction curves based on the newly generated tone-reproduction curve corresponding to the reference media type and reference halftone type combination and the plurality of predetermined relationships between each stored calibrated tone-reproduction curve and the reference media type and reference halftone type combination is updated. The TRCs can be applied upon a page basis. Moreover, generated TRCs can be mapped to existing TRCs to save memory.

12 Claims, 9 Drawing Sheets

METHOD AND SYSTEM OF INDIVIDUALIZING TONE-REPRODUCTION CURVES CALIBRATION AND APPLYING THEREOF

BACKGROUND OF THE PRESENT INVENTION

The present invention relates to calibrating and operating an electronic printer output device. It finds particular application in conjunction with calibrating an electronic printer output device using a tone reproduction curve ("TRC") and will be described with particular reference thereto. Moreover, the present invention also relates to applying a TRC from a plurality of TRCs on a media basis within the printing of a single job. Furthermore, the present invention is directed to calibrating a plurality of TRCs based the calibration of a single media/halftone combination TRC based on a plurality of relationships between the single media/halftone combination TRC and the plurality of TRCs. It will be appreciated, however, that the present invention is also amenable to other like applications.

An electronic printer output device ("printing device"), also referred to as an image output terminal ("IOT"), is generally capable of producing color and standard black-and-white tones to produce images. Such a printing device may be a xerographic print engine, a thermal inkjet device, an acoustic ink print engine, piezo-electric print engine, etc. The printing device accepts color level specifications (typically for each of four (4) colors including cyan, magenta, yellow, and black ("CMYK") or more colors in a high fidelity print engine) as input and produces corresponding color areas on a printed page. This production of the corresponding color areas is often performed by a screening operation (also referred to as a halftoning operation) wherein a fine pattern of color spots is printed. The spots are grouped together to form dots. The dots appear as varying color tones in accordance with the number of color spots used when viewed from a distance. The allowed color level specifications for each of the CMYK color spaces generally vary over some finite range such as 0 to 1 or 0 to 255. The colors at the extremes (i.e., 0 and 1 or 0 and 255) are white and saturated CMYK colors, and numbers between the extremes yield intermediate color tones. However, while the color level specifications may vary linearly, a linear change in color levels typically does not result. Instead, there may be a particular threshold before lighter toned colors become visible. Similarly, darker toned colors may prematurely appear saturated.

A printing device is designed to operate under certain conditions. More specifically, a printing device is calibrated to operate at an ideal set-point, for producing relatively consistent output when used within an environment having specific desired operating parameters such as, for example, a specific humidity, temperature, and dust count, etc. If one or more of the operating parameters deviate from the desired operating parameters, the printing device may drift away from the ideal set point. To some extent, the drift can be corrected with controlled feedback mechanisms within the printing device itself, but typically the printing device requires further corrective action to maintain color consistency in the printed output. The present invention relates to this corrective action.

One way to compensate for the drift within the printing device includes modifying data within a printing device output device controller ("controller"). The controller converts image data (e.g., PostScript® data, PCL data, or PDF data) into raster data, which is transmitted to the printing device where it is printed. More specifically, a TRC modifies the raster data before it is sent to the printing device. A TRC is an electronic map (a graphic representation of the relationship of input v. output) that converts an input image value to a desired image out value. During calibration of a black and white print engine, a test suite of grey patches may be printed out from known image values (grey levels) and the resulting test patches are measured to determine their actual printed image value. A perfect black and white printer would have a TRC that is a linear relationship between the input and the output. In calibration, the actual output of the printing device is measured and a relationship between the input and output is established. The calibration TRC is generated by determining the difference between the ideal and the actual, thereby allowing the TRC to modify the raster data to correct for drift. The resulting image produced by the printing device using the corrected raster data is printed correctly (i.e., as if the printing device had not drifted from the ideal set point and the data was not corrected by the TRC). Both linear and nonlinear drifts within a printing device may be compensated by using calibration TRCs.

In order to accurately produce a desired color level, the correspondence between the color level specification of the printing device and the actual color level produced by the printing device must be known. The TRC provides an illustration of the corresponding relationship.

In order to determine the TRC, a sample set of color level specifications is printed and a device such as a calorimeter or spectrophotometer measures the color levels actually produced by the printing device. The measured points are then used as raw data to calculate a set of curves. The set of curves produced is referred to as the calibration TRCs, or simply as TRCs. Various methods exist for creating TRCs. One such method is set forth in U.S. Pat. No. 5,696,889, which is hereby incorporated by reference.

Although TRCs can be created and applied to correct for drifts in a printing device output, there is currently no method or system that permits a user to specify a specific TRC based on media-type. Moreover, there is currently no method or system that permits a user to specify a specific TRC based on a media/halftone combination. Thirdly, there is currently no method or system that permits a user to specify a specific TRC on a page basis within a single print job. Lastly, there is currently no method or system that permits a user to readjust a plurality of TRCs based the calibration of a single TRC using a reference media and a reference halftone or plurality of reference halftones.

The present invention provides a new and improved apparatus and method that overcomes the above-referenced problems and others.

SUMMARY OF THE PRESENT INVENTION

One aspect of the present invention is directed to a method for applying individualized calibrated tone-reproduction curves to enable printing of image data. This method provides a plurality of calibrated tone-reproduction curves, each calibrated tone-reproduction curve corresponding to a distinct media type; determines a media type to be used in printing the image data; selects a calibrated tone-reproduction curve based on the determined media type; and applies the selected calibrated tone-reproduction curve to print the image data.

Another aspect of the present invention is a system for applying individualized calibrated tone-reproduction curves to enable printing of image data. The system includes a storage device to store and provide a plurality of calibrated tone-reproduction curves, each calibrated tone-reproduction curve corresponding to a distinct halftone type and media type combination; an input device to select a media type to be used in printing the image data and to select a halftone to be used in printing the image data; and a processor to select a calibrated tone-reproduction curve based on the selected media type and determined halftone type and to apply the selected calibrated tone-reproduction curve to print the image data.

A further aspect of the present invention is a system for applying individualized calibrated tone-reproduction curves to enable printing of image data. The system includes storage means for storing and providing a plurality of calibrated tone-reproduction curves, each calibrated tone-reproduction curve corresponding to a distinct halftone type and media type combination; first means for determining a media type to be used in printing the image data; second means for determining a halftone to be used in printing the image data; and third means for selecting a calibrated tone-reproduction curve based on the determined media type and determined halftone type and applying the selected calibrated tone-reproduction curve to print the image data.

A fourth aspect of the present invention is a method for applying individualized calibrated tone-reproduction curves on a single page basis to enable printing of image data associated with a job having a plurality of pages. The method provides a plurality of calibrated tone-reproduction curves, each calibrated tone-reproduction curve corresponding to a distinct media type; assigns a first media type to a first group of pages in the job; assigns a second media type to a second group of pages in the job; receives a page of image data to be printed; selects a calibrated tone-reproduction curve for the received page of image data based on the assigned media type; and applies the selected calibrated tone-reproduction curve to print the page of image data.

A fifth aspect of the present invention is a system for applying individualized calibrated tone-reproduction curves on a single page basis to enable printing of image data associated with a job having a plurality of pages. The system includes a storage device to store and provide a plurality of calibrated tone-reproduction curves, each calibrated tone-reproduction curve corresponding to a distinct media type; an input device to assign a first media type to a first group of pages in the job and to assign a second media type to a second group of pages in the job; and a processor to receiving a page of image data to be printed, to select a calibrated tone-reproduction curve for the received page of image data based on the assigned media type, and to apply the selected calibrated tone-reproduction curve to print the page of image data.

A sixth aspect of the present invention is a method for applying individualized calibrated tone-reproduction curves on a single page basis to enable printing of image data associated with a job having a plurality of pages. The method performs a plurality of calibration operations, each calibration operation using a distinct media type; generates a tone-reproduction curve for each media type; stores the generated the tone-reproduction curves; assigns a first media type to a first group of pages in the job; assigns a second media type to a second group of pages in the job; receives a page of image data to be printed; selects a calibrated tone-reproduction curve for the received page of image data based on the assigned media type; and applies the selected calibrated tone-reproduction curve to print the page of image data.

A seventh aspect of the present invention is a method for applying a calibrated tone-reproduction curve to enable printing of image data. The method provides a plurality of predetermined stored calibrated tone-reproduction curves and a map providing links between calibrated tone-reproduction curves and distinct media type, a stored calibrated tone-reproduction curve being capable of being mapped to more than one media type; generates a tone-reproduction curve corresponding to a new media type calibration operation; displays the generated tone-reproduction curve; displays each of the predetermined stored calibrated tone-reproduction curves; selects from either the displayed generated tone-reproduction curve or one of the displayed predetermined stored calibrated tone-reproduction curves to be associated with the new media type; stores the displayed generated tone-reproduction curve when the displayed generated tone-reproduction curve is selected to be associated with the new media type and updating the map to reflect a link between the new media type and the stored generated tone-reproduction curve; and updates the map to reflect a link between the new media type and the selected one of the displayed predetermined stored calibrated tone-reproduction curves when one of the displayed predetermined stored calibrated tone-reproduction curves is selected to be associated with the new media type.

An eighth aspect of the present invention is a system for applying a calibrated tone-reproduction curve to enable printing of image data. The system includes a storage device to store and provide a plurality of predetermined stored calibrated tone-reproduction curves and a map providing links between calibrated tone-reproduction curves and distinct media type, a stored calibrated tone-reproduction curve being capable of being mapped to more than one media type; a calibration circuit to generate a tone-reproduction curve corresponding to a new media type calibration operation; a display to display the generated tone-reproduction curve and each of the predetermined stored calibrated tone-reproduction curves; a user interface to enable selecting of either the displayed generated tone-reproduction curve or one of the displayed predetermined stored calibrated tone-reproduction curves to be associated with the new media type; and a processor to cause the storage device to store the displayed generated tone-reproduction curve when the displayed generated tone-reproduction curve is selected to be associated with the new media type and to update the stored map to reflect a link between the new media type and the stored generated tone-reproduction curve. The processor updates the stored map to reflect a link between the new media type and the selected one of the displayed predetermined stored calibrated tone-reproduction curves when one of the displayed predetermined stored calibrated tone-reproduction curves is selected to be associated with the new media type.

A ninth aspect of the present invention is a method for applying a calibrated tone-reproduction curve to enable printing of image data. The method provides a plurality of predetermined stored calibrated tone-reproduction curves and a map providing links between calibrated tone-reproduction curves and distinct media type, a stored calibrated tone-reproduction curve being capable of being mapped to more than one media type; generates a tone-reproduction curve corresponding to a new media type calibration operation; compares the generated tone-reproduction curve with each of the plurality of predetermined stored calibrated tone-reproduction curves to determine if one of the plurality of predetermined stored calibrated tone-reproduction curves has similar characteristics; selects, automatically, the generated tone-reproduction curve to be associated with the new media type when the generated tone-reproduction curve has non-similar characteristics with each of the plurality of predetermined stored calibrated tone-reproduction curves; selects, automatically, a predetermined stored calibrated tone-reproduction curve to be associated with the new media type, the selected predetermined stored calibrated tone-reproduction curve having similar characteristics to the generated tone-reproduction curve; stores the generated tone-reproduction curve and updating the stored map to reflect a link between the new media type and the stored generated tone-reproduction curve when the generated tone-reproduction curve is selected to be associated with the new media type; and updates the stored map to reflect a link between the new media type and the selected one of the predetermined stored calibrated tone-reproduction curves when one of the predetermined stored calibrated tone-reproduction curves is selected to be associated with the new media type.

A tenth aspect of the present invention is a system for applying a calibrated tone-reproduction curve to enable printing of image data. The system includes a storage device to store and provide a plurality of predetermined stored calibrated tone-reproduction curves and a map providing links between calibrated tone-reproduction curves and distinct media type, a stored calibrated tone-reproduction curve being capable of being mapped to more than one media type; calibration means for generating a tone-reproduction curve corresponding to a new media type calibration operation wherein the calibration means compares the generated tone-reproduction curve with each of the plurality of predetermined stored calibrated tone-reproduction curves to determine if one of the plurality of predetermined stored calibrated tone-reproduction curves has similar characteristics and selects, automatically, the generated tone-reproduction curve to be associated with the new media type when the generated tone-reproduction curve has non-similar characteristics with each of the plurality of predetermined stored calibrated tone-reproduction curves or selects, automatically, a predetermined stored calibrated tone-reproduction curve to be associated with the new media type, the selected predetermined stored calibrated tone-reproduction curve having similar characteristics to the generated tone-reproduction curve; and a processor to cause the storage device to store the generated tone-reproduction curve and to update the stored map to reflect a link between the new media type and the stored generated tone-reproduction curve when the calibration means selects the generated tone-reproduction curve to be associated with the new media type. The processor updates the stored map to reflect a link between the new media type and the selected one of the predetermined stored calibrated tone-reproduction curves when the calibration means selects one of the predetermined stored calibrated tone-reproduction curves to be associated with the new media type.

An eleventh aspect of the present invention is a method for updating individualized calibrated tone-reproduction curves. The method provides a plurality of predetermined stored calibrated tone-reproduction curves, each predetermined stored calibrated tone-reproduction curve corresponding to a distinct media type and halftone type combination; provides a plurality of predetermined relationships between each stored calibrated tone-reproduction curve and a reference media type and reference halftone type combination; generates a new tone-reproduction curve corresponding to a reference media type and reference halftone type combination calibration operation; and updates each predetermined stored calibrated tone-reproduction curves based on the newly generated tone-reproduction curve corresponding to the reference media type and reference halftone type combination and the plurality of predetermined relationships between each stored calibrated tone-reproduction curve and the reference media type and reference halftone type combination.

A twelfth aspect of the present invention is a method for updating individualized calibrated tone-reproduction curves. The method provides a plurality of predetermined stored calibrated tone-reproduction curves, each predetermined stored calibrated tone-reproduction curve corresponding to a distinct media type and halftone type combination; provides a plurality of predetermined relationships between each stored calibrated tone-reproduction curve corresponding to a first halftone type and a reference media type and first halftone type combination; provides a plurality of predetermined relationships between each stored calibrated tone-reproduction curve corresponding to a second halftone type and a reference media type and second halftone type combination; generates a new tone-reproduction curve corresponding to a reference media type and first halftone type combination calibration operation; and updates each predetermined stored calibrated tone-reproduction curves corresponding to the first halftone type based on the newly generated tone-reproduction curve corresponding to the reference media type and first halftone type combination and the plurality of predetermined relationships between each stored calibrated tone-reproduction curve corresponding to the first halftone type and the reference media type and first halftone type combination.

A thirteenth aspect of the present invention is a system for updating individualized calibrated tone-reproduction curves. The system includes a storage device to store and provide a plurality of predetermined stored calibrated tone-reproduction curves, each predetermined stored calibrated tone-reproduction curve corresponding to a distinct media type and halftone type combination wherein the storage device storing and providing a plurality of predetermined relationships between each stored calibrated tone-reproduction curve and a reference media type and first halftone type combination; tone-reproduction curve means for generating a new tone-reproduction curve corresponding to a reference media type and first halftone type combination calibration operation; and a processor to update each predetermined stored calibrated tone-reproduction curves based on the newly generated tone-reproduction curve corresponding to the reference media type and first halftone type combination and the plurality of predetermined relationships between each stored calibrated tone-reproduction curve and the reference media type and first halftone type combination.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention.

DETAILED DESCRIPTION OF PREFERRED EMBODIMENTS OF THE PRESENT INVENTION

Ideally, to enable a printing device to operate optimally, the printer, or more likely, the digital front end ("DFE") of the printing device would have all possible TRCs representing all possible media/halftone interactions or combinations. To have realize such a state, the operator would need to calibrate for each for every media/halftone combination. Not only would the initial calibrations need to take place, each TRC would need to be recalibrated, thereby resulting in a large amount of downtime for the printing device. Conventionally, printing systems only allow the operator to calibrate for the media that is going to be used at that moment by the printing device. Again, this causes large amount of downtime if the printing device is continually changing media.

To better understand the aspects and advantages of the present invention, the process of TRC calibration will be explained. To facilitate this explanation, a few terms will be defined at the outset. In this explanation, fingerprint is directed to the native or raw response of the IOT or printing device; e.g., simply printing a test halftone patch on a media.

Aim Curve or ideal curve is the desired response; e.g., what the device should look like in terms of its response to input.

Gray Balance is a situation where Cyan=Magenta=Yellow will produce a neutral grey on some media under some illuminant. This is generally not possible throughout the entire range of CMY. As density increases, after a certain point (breakpoint), it becomes impossible to hold grey. For densities higher than this breakpoint, it is desirable to have each of the C, M, and Y curves to behave smoothly. T realize this situation, a procedure can be implemented that will insure a smooth curve from a given breakpoint to its maximum digital image; e.g., in an 8-bit system, the maximum digital image value is 255. This produces smooth TRCs after the breakpoint and insures that each TRC goes smoothly to its maximum digital image value.

Figure 1:
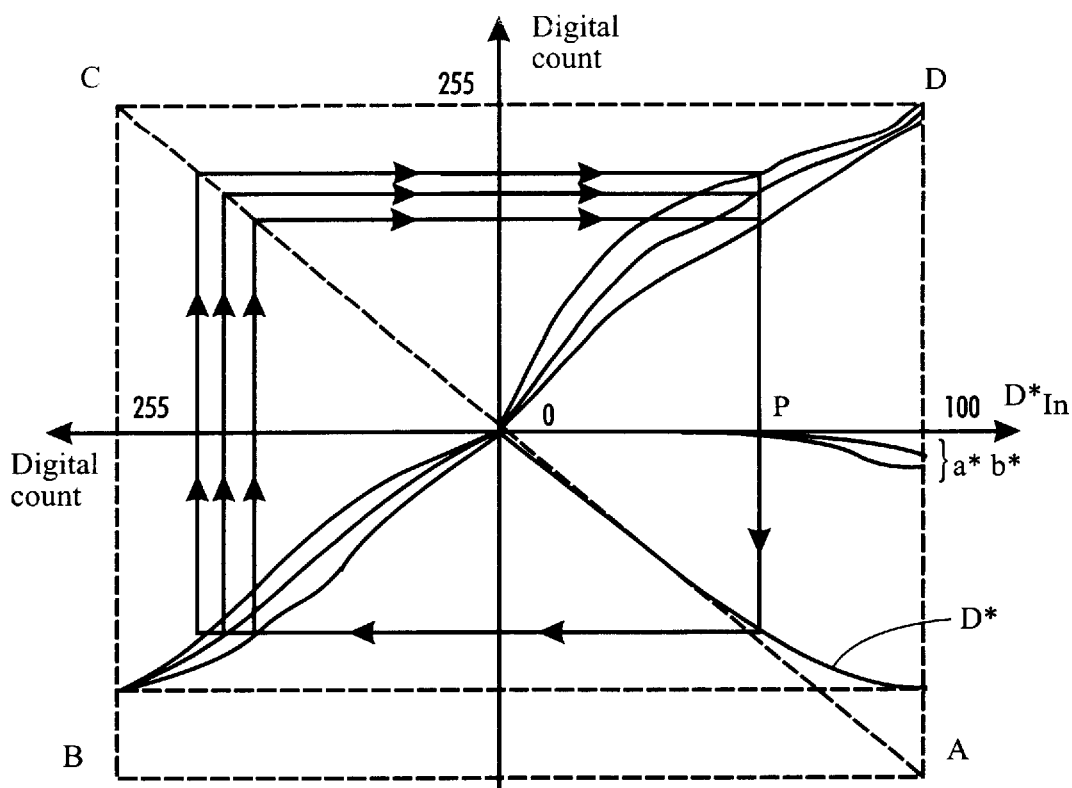
FIG. 1 is a graphical illustration of a Jones Diagram for calibrating user specified tone reproduction curve (TRC)

FIGS. 1–5 will be used to describe a TRC calibration process. In FIG. 1, a Jones Diagram is presented to show how a TRC is generated. As used in FIG. 1, darkness D* is defined as D*=100−L*. In quadrant A of the Jones Diagram of FIG. 1, a user-specified aim curve is shown. The D* curve, used in the actual TRC calculation, is shown in black. Also shown in quadrant A are the a* and b* curves that represent the allowed deviation from perfect neutral near the black point. Conventionally, this set of curves is stored in some central location.

Quadrant B of FIG. 1 shows the C, M, and Y digital counts needed to print, on a particular printing device, a color at a specified darkness D* and at a specified chrominance a*, b* (given implicitly by the curves in quadrant A). The plot in quadrant B is obtained by fingerprinting the particular printing device and running an iterative model to derive C, M, Y combinations that yield the desired D* a*b* response. In one example, the iterative model will search for exactly neutral colors. An iterative model could also be used to search for near-neutrals of specified a* and b*.

Quadrant C of FIG. 1 represents a 45-degree transposition of axes, with the plot in quadrant D showing the resulting TRC.

To derive the TRCs, the process begins with a point P and projects it onto the user specified D* aim curve in quadrant A. Next, the output D* value is mapped onto the C, M, Y digital counts in quadrant B. Quadrant C is used to transpose the plot of quadrant B to produce the TRCs of quadrant D.

Figure 2:
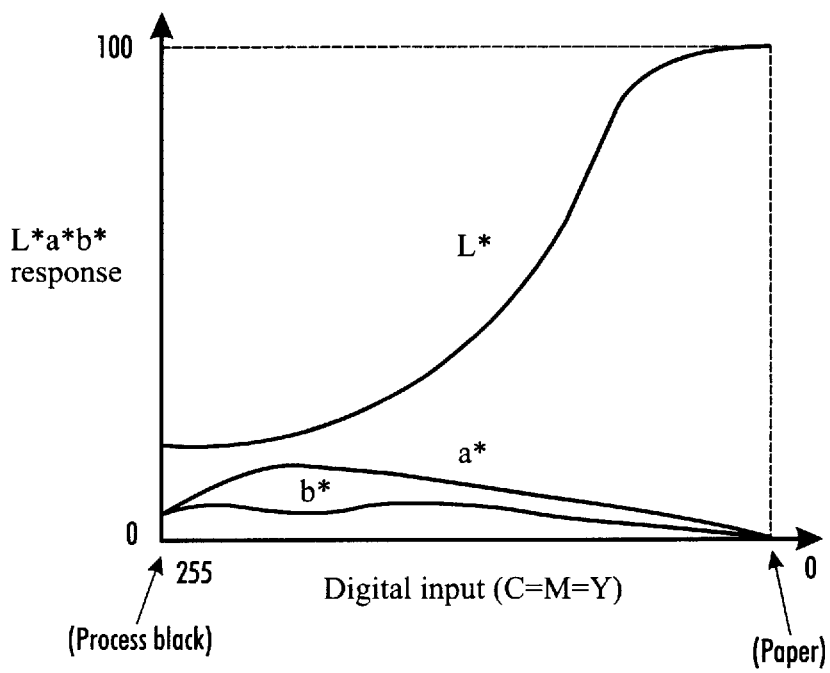
FIG. 2 is a graphical illustration of a raw TRC or fingerprint of a printing device.
Figure 3:
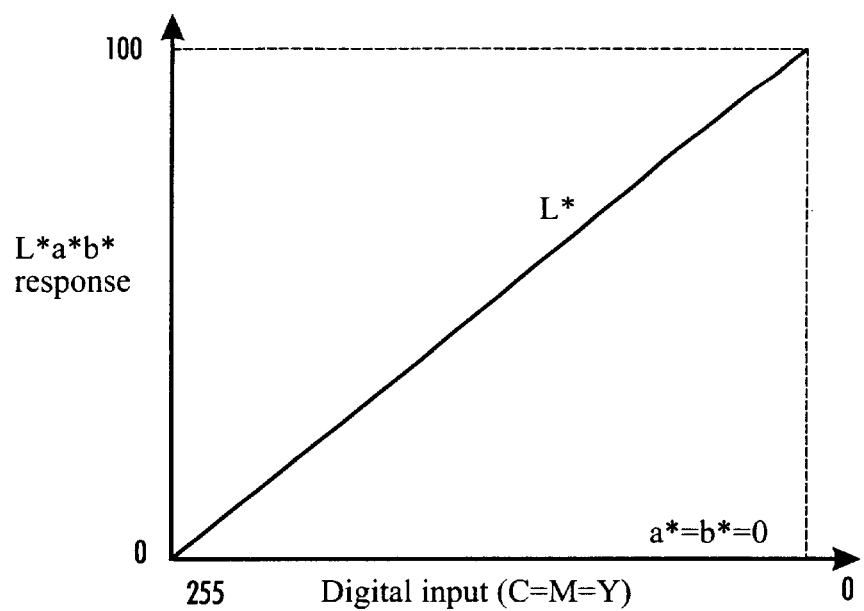
FIG. 3 is a graphical illustration of an ideal TRC for a printing device.
Figure 4:
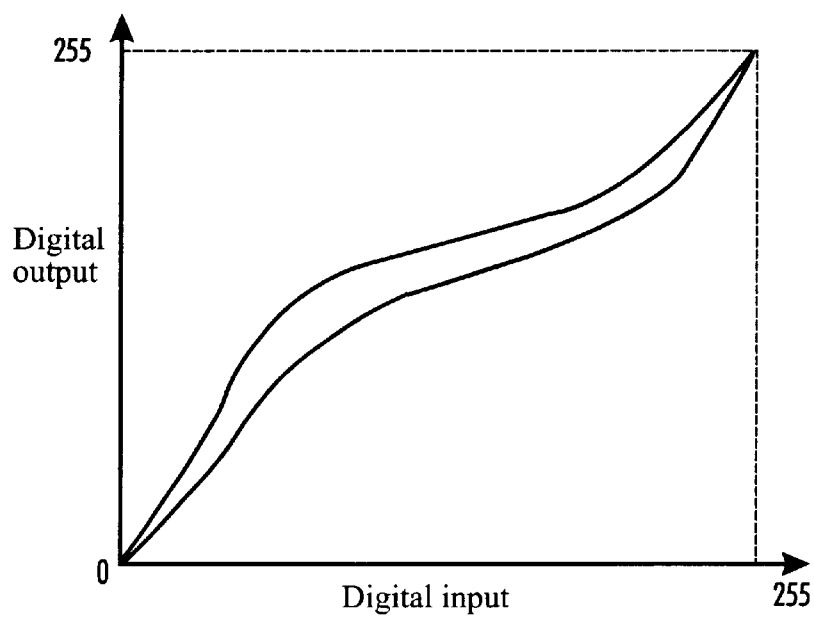
FIG. 4 is a graphical illustration of a desired TRC for a printing device having CMY held equal.

FIGS. 2–5 breakdown the process illustrated in FIG. 1 to its individual components. In FIG. 2, a fingerprint or the raw response of a printing device is graphically shown; e.g., if C=M=Y is sent to the raw printer, and the resulting colors are measured so as to get a certain L*, a*, b* response out. FIG. 3 shows the desired response of the printer to a specified input. In this case, the input is a neutral C=M=Y sweep. The curve shows a perfectly linearized and gray-balanced printer. The input is a gray sweep from perfect black to white, and this is perfectly reproduced by the ideal device. FIG. 4 is a TRC calibration curve. Note that the desire curve of FIG. 3 is different from the actual fingerprint of FIG. 2. In order to achieve the desired curve, a calibration TRC is derived that compensates and corrects for the fingerprint of the printing device. This involves printing a target of patches on the printing device (especially around neutrals), measuring the fingerprint, and essentially inverting this fingerprint to achieve the ideal curve. An additional step of normalizing smoothly at either end should also be done.

Figure 5:
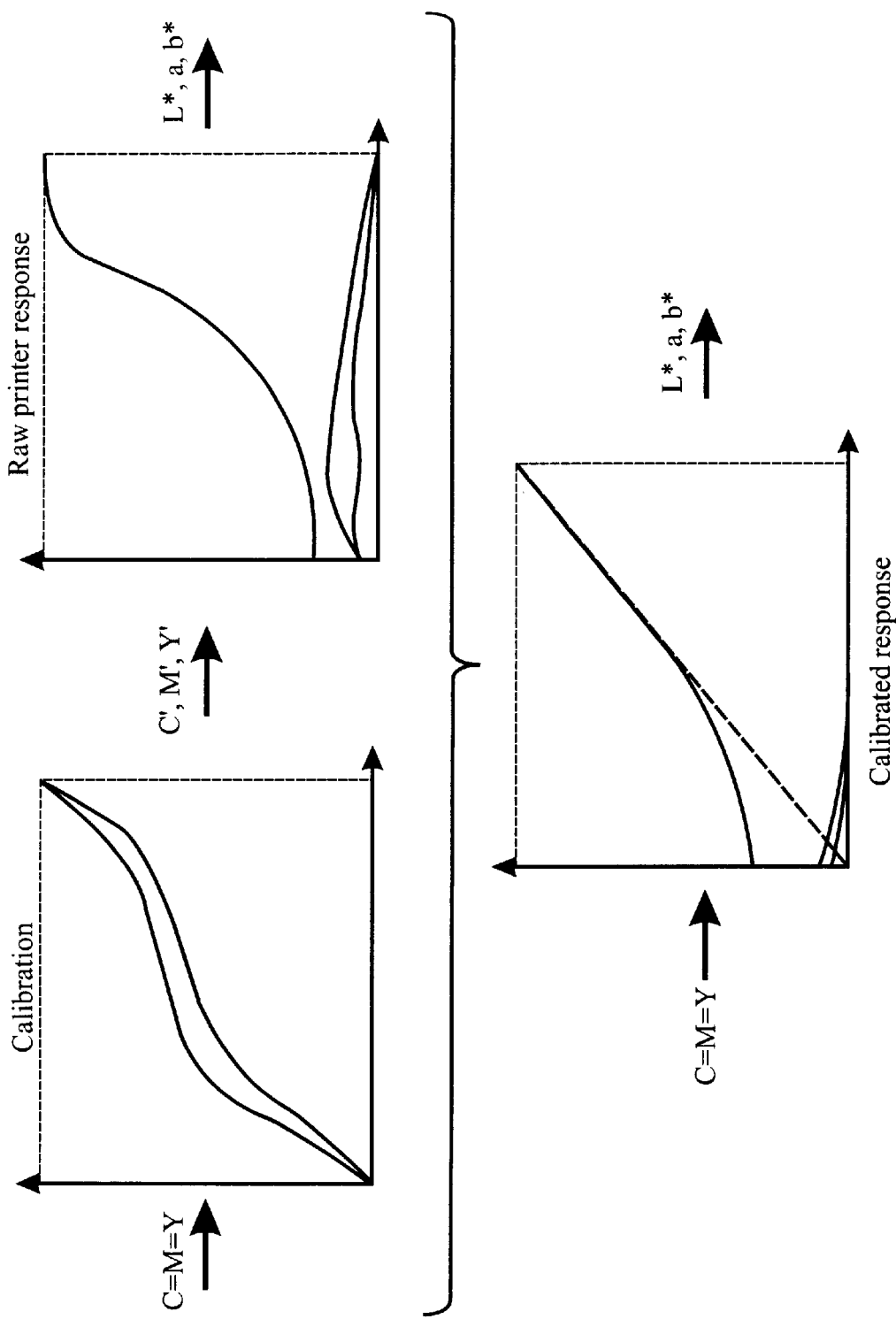
FIG. 5 is a graphical illustration of a TRC calibration process.

Upon generating this calibrated TRC, the calibration TRC is then placed in front of the printer so that the response of the calibrated printer (i.e., the TRC-printer combination) matches the desired curve. This is shown in FIG. 5. Note that while the TRC calibration has brought the response of the overall system (solid lines) a lot closer to the ideal curve (dotted 45° line in bottom plot) than the raw printer, it still does not coincide exactly with the ideal curve (dotted 45° line in bottom plot). This is because it is impossible to achieve the full dynamic range from L*=100 to L*=0 on any real printer; and it is also generally impossible to achieve perfect neutrality all the way to black.

In calibration a controller converts original image data (e.g., PostScript® or PDF format), which is received by the controller, to final image data (e.g., raster data). The final image data is transmitted from the controller to a printing device, which prints the image data on an output medium or media. The output medium is some type of paper (e.g., glossy or semi-glossy). However, other types of output media (e.g., plastic transparency) are also contemplated.

By operating various input devices (e.g., a keyboard and/or a mouse) and a viewing monitor, which communicate with the controller, a user is capable of correcting a calibration drift (or a drift from an optimum set-point), which is associated with the printing device, by processing the final image data that is transmitted to the printing device. In other words, if the calibrated settings of the printing device drift over time, the final image data that is transmitted to the printing device may be modified to bring the output produced by the printing device back to the desired quality.

Figure 7:
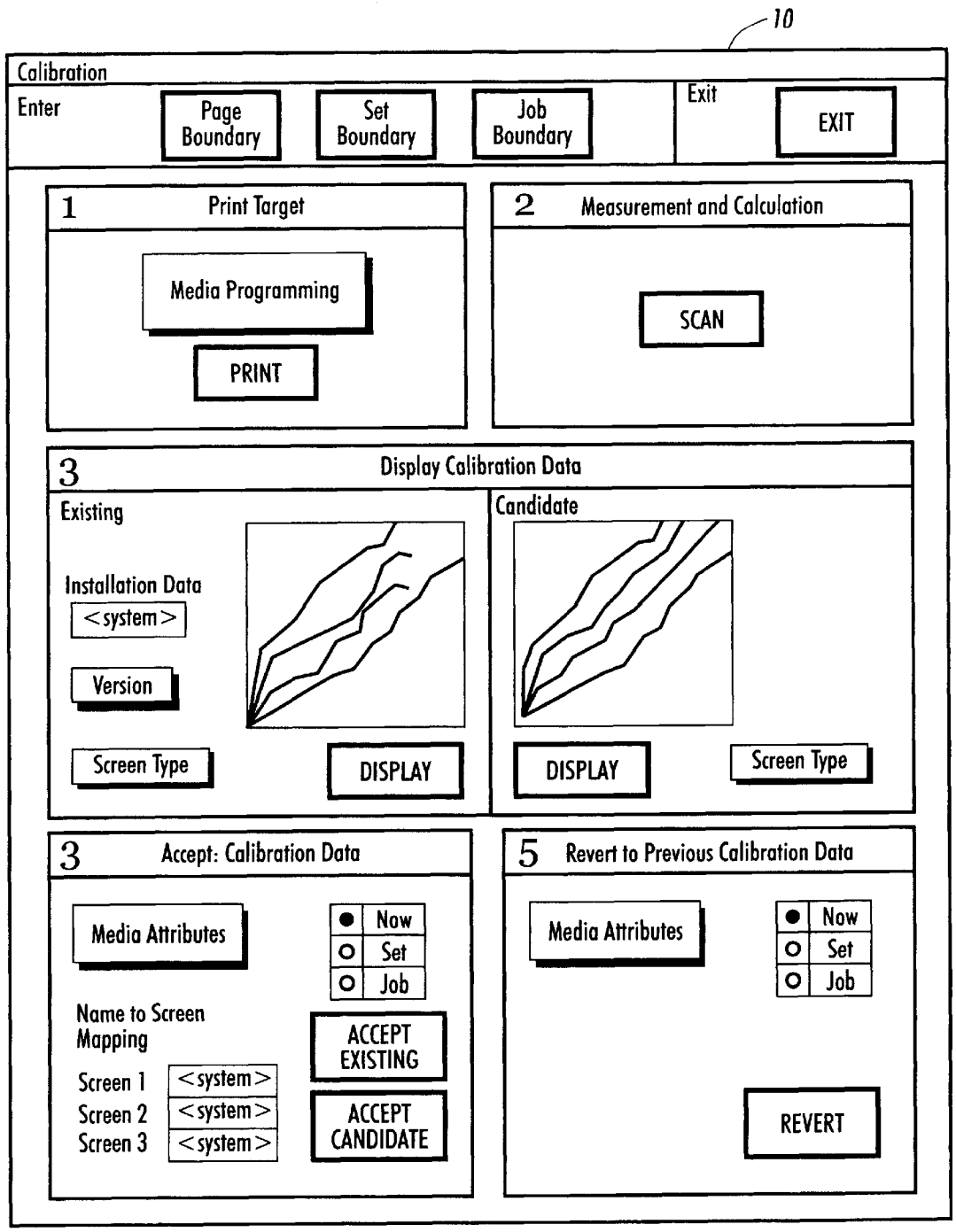
FIG. 7 is an example of an user-input display for mapping TRCs according to the present invention.

Once the calibration is completed, it may be desirable to determine if the resulting TRC is similar to TRCs already stored in the DFE. In other words, if the resulting TRC is within certain predetermined parameters of an existing TRC, the media/halftone combination used to generate the TRC can be mapped to an existing TRC, thereby realizing a savings in memory. FIG. 7 illustrates a user-responsive display to enable such a mapping.

With reference to FIG. 7, the display allows a user to merely revert back to a previously stored set of TRCs as available in window 5 or the user can generate new TRC data. To generate a new TRC, a calibration boundary is specified by the user. More specifically, using a user input device, the user selects one of three (3) "boundary buttons" displayed on a monitor. In this way, the user can delay the calibration process from beginning until after the specified calibration boundary is reached.

An output "job boundary" includes one or more "sets," while each "set" includes one or more groups of "pages." Therefore, a user may, for example, desire to print five (5) sets of groups, each of which includes three (3) pages. Clicking on the Page Boundary button delays the beginning of the calibration process until after the current page is completely printed; clicking on the Set Boundary button delays the beginning of the calibration process until after the current set (e.g., group of three (3) pages) is completely printed; clicking on the Job Boundary button delays the beginning of the calibration process until after the current job (e.g., all five (5) sets) is completely printed.

There are several reasons why it is desirable to specify a calibration boundary for delaying the start of the calibration process. For example, although an output quality has begun to deteriorate, it may be desirable to keep all pages within each set to a consistent level of quality, which would be achieved by clicking the Set Boundary button. Alternatively, if it is desirable to maintain a consistent level of quality within a job, the user would click the Job Boundary button. Furthermore, because the process described below requires a calibration image (target image) to be produced, the Page Boundary button alerts the system to finish printing the current page so that a complete calibration page (target page), which includes the calibration image, may be produced.

Once the calibration boundary is reached, the controller suspends an output process of the printing device. Then the user specifies the type of medium (e.g., glossy paper, matted paper, clear transparency, etc.) on which the calibration image (target image) is to be produced by selecting a Media Programming button in window 1. The target image is produced on the specified medium using the printing device by selecting a Print button. Preferably, the target image represents all the halftone screens supported by the printing device. The target image is input into an image processor, preferably using a color measurement device, such as a calorimeter or spectrophotometer, by selecting a Scan button. More specifically, colors on the target image are measured. Then, data representing the measured colors is transmitted from the scanning device to the processor, which is preferably included within the controller. Then, the processor calculates candidate sets of tone reproduction curves. The number of sets so produced is preferably the same as the number of halftone screens supported by the printing device.

It is to be understood that the candidate sets of TRCs are stored in memory accessible by the processor. In this manner, the candidate sets of TRCs may be recalled at a future time as existing TRCs, the benefits of which will become apparent from the discussion outlined below.

Each of the candidate sets of TRCs represents one of the halftone screens supported by the printing device. Furthermore, each of the sets preferably includes four (4) lines; each of the lines corresponds to one of the colors in the CMYK color space.

The processor causes the display 10 to display one of the sets of TRCs that meet certain predetermined parameters so as to find the best fitting TRC. This selection is further enhanced by having the user to select the screen type of the print target by using the Screen Type button before selecting a Display button. Once the Display button is selected, an image of the candidate set of TRCs for the selected screen type is displayed.

The user can also browses through previously stored versions of TRCs (i.e., existing TRCs) for the specified medium type, which are stored in the controller and classified according to halftone screens by inputting a different screen type and re-engaging the Display button. As discussed above, the candidate sets of TRCs that were calculated by the processor will be available as existing TRCs in future calibration processes.

The user compares the currently displayed candidate TRC set with the currently displayed existing TRC set. For example, the user may be familiar with the output that will be produced using the currently displayed existing TRC set. Furthermore, a sophisticated user may be able to determine whether the candidate TRC set will produce acceptable output on the printing device by comparing the lines of the candidate with the lines in the existing TRC.

The user can accept the currently displayed candidate TRC set. If the user accepts the candidate, the media/halftone combination associated with the existing TRC will be mapped to this TRC. If the user does not decide to accept the candidate TRC set, the user can accept the existing TRC and it will be stored and the media/halftone combination associated with the existing TRC will be mapped accordingly.

The user sets an acceptance boundary after which the new (accepted) TRC set (i.e., the currently displayed candidate TRC set) will be used by the processor for generating future final image data. More specifically, the user selects one of the Now, Set, or Job buttons to indicate that the new TRC set will be used beginning with the next output page, set, or job, respectively. Then the user also sets the media type (by selecting a Media Attributes button) with which the new set of tone reproduction curves will be used. A default medium type, which is the medium type selected in the beginning of the calibration process, is initially displayed.

In the preferred embodiment, a plurality of predetermined stored calibrated tone-reproduction curves is provided in a memory. The memory or memory logic further includes a map that provides links between calibrated tone-reproduction curves and distinct media type. In such a system, a stored calibrated tone-reproduction curve may be mapped to more than one media type. During calibration, a tone-reproduction curve is generated corresponding to a new media/halftone combination, or the calibration could correspond to only a new media type. The generated tone-reproduction curve is displayed along with each of the predetermined stored calibrated tone-reproduction curves. A user may select from either the displayed generated tone-reproduction curve or one of the displayed predetermined stored calibrated tone-reproduction curves to be associated with the new media type or media/halftone combination. The displayed generated tone-reproduction curve is stored when the displayed generated tone-reproduction curve is selected to be associated with the new media type or media/halftone combination and the map is updated to reflect a link between the new media type or media/halftone combination and the stored generated tone-reproduction curve. The map is updated to reflect a link between the new media type or media/halftone combination and the selected one of the displayed predetermined stored calibrated tone-reproduction curves when one of the displayed predetermined stored calibrated tone-reproduction curves is selected to be associated with the new media type or media/halftone combination. Each of the predetermined stored calibrated tone-reproduction curves may be displayed sequentially or simultaneously.

Also, the user may select from either the displayed generated tone-reproduction curve or one of the displayed predetermined stored calibrated tone-reproduction curves to be associated with the new media type for a selected job. With respect to this selection process, the displayed generated tone-reproduction curve is temporarily stored when the displayed generated tone-reproduction curve is selected to be associated with the new media type or media/halftone combination and the map is temporarily updated to reflect a temporary link between the new media type or media/halftone combination and the stored generated tone-reproduction curve; or the map is temporarily updated to reflect a temporary link between the new media type or media/halftone combination and the selected one of the displayed predetermined stored calibrated tone-reproduction curves when one of the displayed predetermined stored calibrated tone-reproduction curves is selected to be associated with the new media type or media/halftone combination.

In another embodiment, the generated a tone-reproduction curve corresponding to a new media type or media/halftone combination is compared with each of the plurality of predetermined stored calibrated tone-reproduction curves to determine if one of the plurality of predetermined stored calibrated tone-reproduction curves has similar characteristics. The generated tone-reproduction curve is automatically selected to be associated with the new media type or media/halftone combination when the generated tone-reproduction curve has non-similar characteristics with each of the plurality of predetermined stored calibrated tone-reproduction curves, or a predetermined stored calibrated tone-reproduction curve is automatically selected to be associated with the new media type or media/halftone combination, the selected predetermined stored calibrated tone-reproduction curve having similar characteristics to the generated tone-reproduction curve. Thereafter, the storing process and map updating process are carried out as before.

Figure 11:
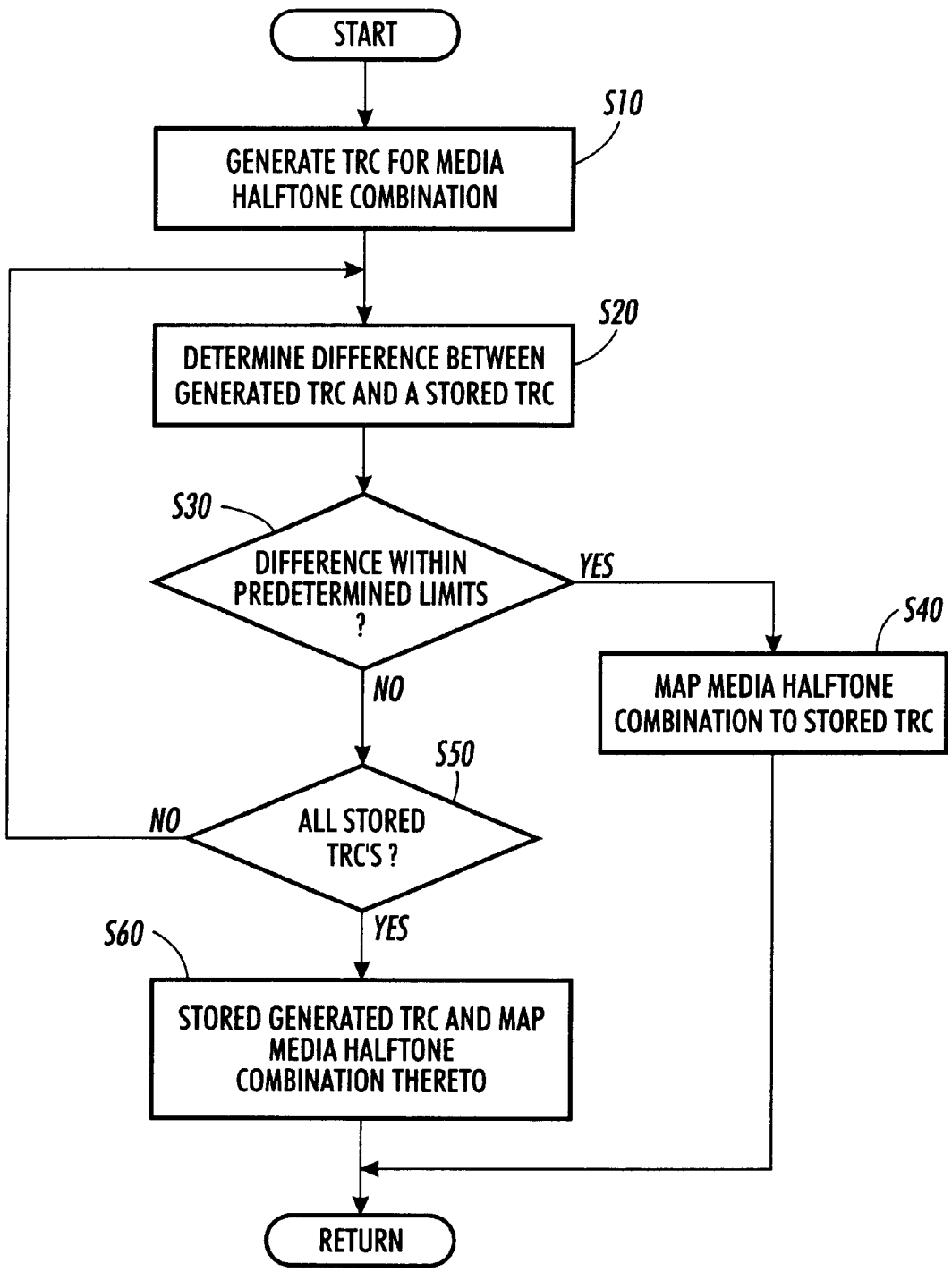
FIG. 11 is a flowchart automatic mapping of TRCs according to the present invention.

FIG. 11 illustrates a flowchart that enables the automatic selection in a mapping process. At Step S10, a TRC is generated for a media type or media/halftone combination. The generated TRC is compared with a stored TRC at Step S20. From this comparison, it is determined if a difference is within predetermined limits at Step S30. If the difference is within predetermined limits, the media type or media/halftone combination is mapped to the stored TRC at Step S40. On the other hand, if the difference is not within predetermined limits, the process determines if all the stored TRCs have been compared with the generated TRC at Step S50. If step S50 is no, a loop back is carried out. If step S50 is yes, the generated TRC is stored and the media type or media/halftone combination is mapped thereto at Step S60

As discussed above, TRCs are media dependent, and thus, it undesirable to apply the same TRC over different media types wherein the job being printed may include the printing of images on different media types. In another embodiment of the present invention, the user is enable to designate different media types within a single job and have the appropriate TRC(s) applied for that media type.

Figure 6:
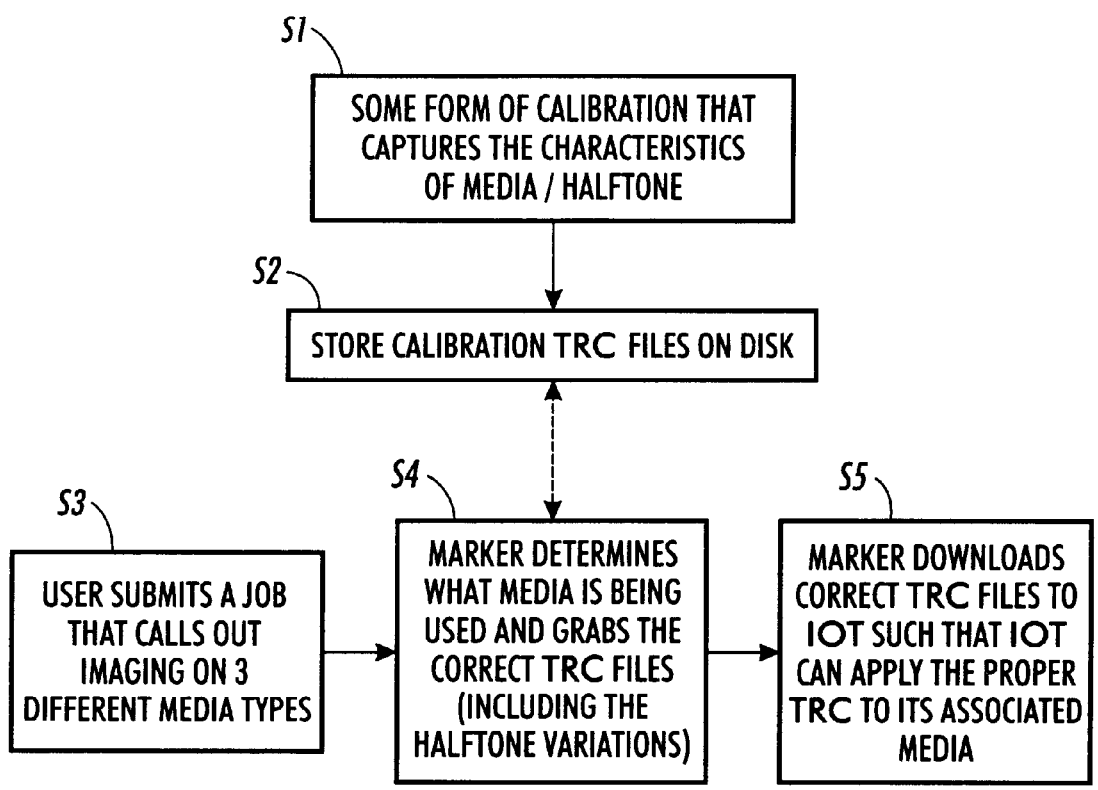
FIG. 6 is a flowchart illustrating applying individualized TRCs on a media basis according to the present invention.

FIG. 6 illustrates a method that contemplates this desired result. As shown in FIG. 6, a calibration process as discussed above, is used in Step S1 to capture the characteristics of a media type or media/halftone combination and produce an appropriate TRC. These TRCs are stored in memory at Step S2.

At Step S3, the user submits a job that requires imaging on a plurality of different media types. Thereafter, at Step S4, a processor uses a tag system or other system to determine the type of media being used and retrieves the appropriate TRC(s), including halftone variations, if necessary. The retrieved TRC(s) are provided to the printing device at Step S5 for proper printing of the image.

In this embodiment, a media type to be used in printing the image data is determined so that a calibrated tone-reproduction curve can be selected based on the determined media type from a plurality of calibrated tone-reproduction curves, each calibrated tone-reproduction curve corresponding to a distinct media type. The selected calibrated tone-reproduction curve to print the image data. The calibrated tone-reproduction curve can also be selected based on the determined media type and determined halftone type.

In another embodiment, individualized calibrated tone-reproduction curves are applied on a single page basis to enable printing of image data associated with a job having a plurality of pages. In this embodiment a first media type is assigned to a first group of pages in the job, and a second media type is assigned to a second group of pages in the job. A page of image data to be printed is received and a calibrated tone-reproduction curve for the received page of image data is selected based on the assigned media type so that the selected calibrated tone-reproduction curve is applied to print the page of image data. The selection process may also consider the halftone to be used in printing wherein the halftone is determined by a conventional auto-segmentation routine.

Figure 10:
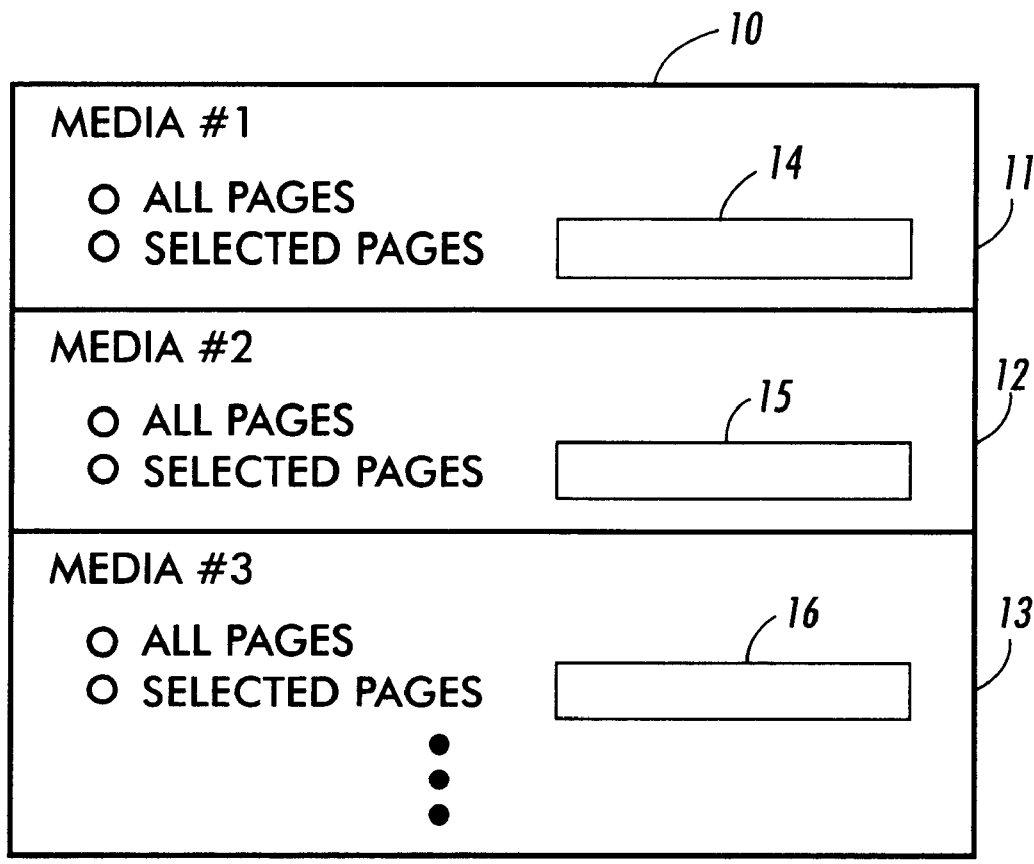
FIG. 10 is an example of an user-input display for defining media types for specific pages within a single job according to the present invention.

FIG. 10, illustrates an embodiment which enables the user to assign media types to certain pages within a job. In FIG. 10, the plurality of available media types are displayed on display 10 in a plurality of windows 11, 12, and 13, each window being associated with a particular media type. The user may select either a media type for all of the job or just certain selected pages of the job in input boxes 14, 15, and 16. If the "selected pages" button is activated, one of the input boxes 14, 15, or 16 is activated for input. If the user input less than all pages in the job, upon selection of the next "selected pages" button, the associated input box is automatically filled with the remaining non-selected pages for the user.

Another problem, mentioned above, is the downtime required to update TRCs if the printing system maintains a large number of TRCs. The present invention provides a system that enables the user to perform one calibration upon a reference media and automatically update all existing TRCs even if the TRCs are not associated with the reference media. The output of a printing device is a function of the media and halftones used and time wherein time reflects the problem of drift. The function of media is mostly constant over time such that is reasonable to assume that the media function is a constant. Moreover, the halftone function can be assume to be constant. With these assumptions, the present invention generates a plurality of mathematical relationships, each relationship being between a reference media type or reference media/halftone combination and one of the pre-stored TRCs. In this way, a user can calibrate using a single reference media or media/halftone combination and be able to update all TRCs in the system. In other words, the present invention calibrates to a single reference media or reference media/halftone combination, and based upon predetermined relationships, apply an universal update to all existing TRCs based on an algorithm that uses the new reference TRC and the predetermined relationships.

Figure 8:
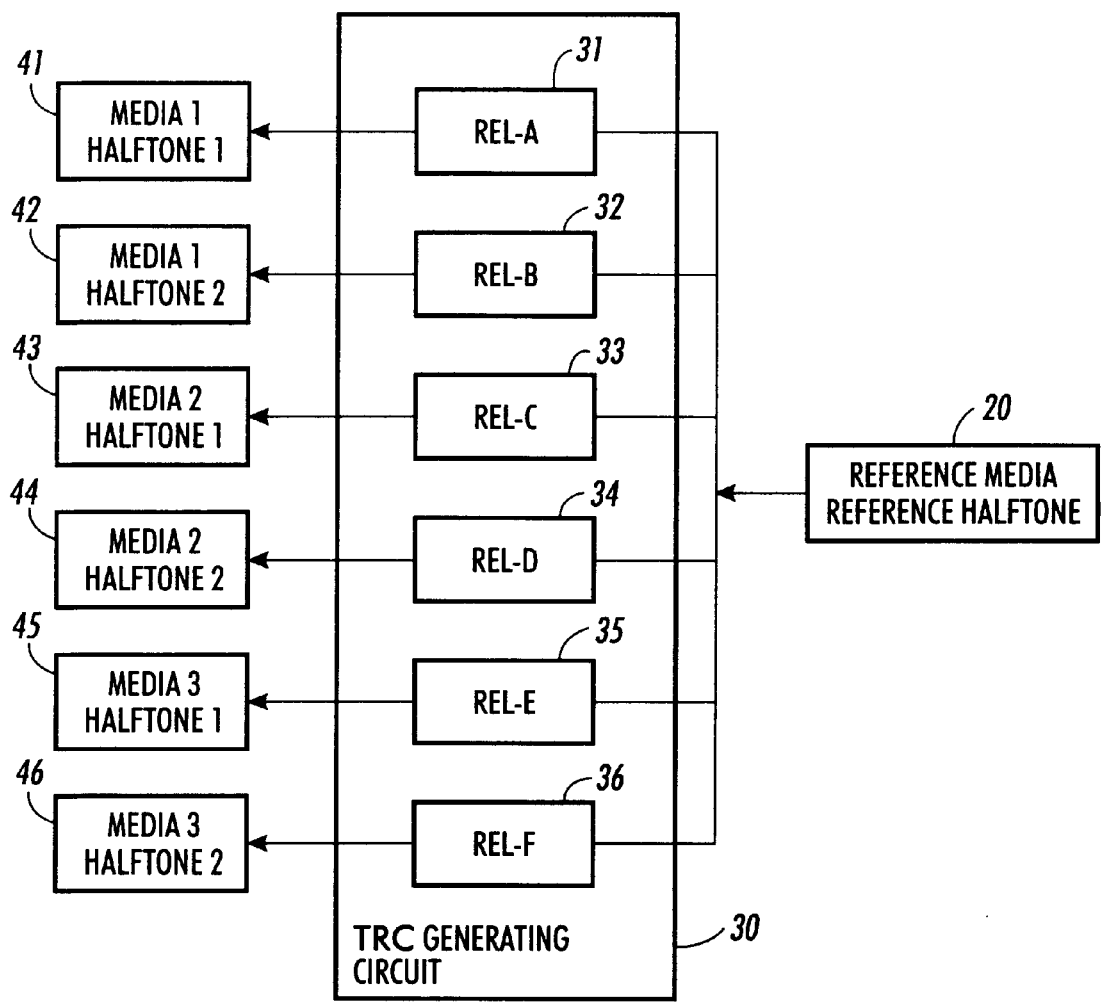
FIG. 8 is a block diagram showing one embodiment of an updating calibration process according to the present invention.

FIG. 8 shows a block diagram of one embodiment of the present invention. In FIG. 8, a reference media/halftone combination TRC 20 is input to a TRC generating circuit 30 that contains all the predetermined relationships 31–36. The TRC generating circuit 30 uses the reference media/halftone combination TRC 20 and the predetermined relationships 31–36 to generate updated TRCs 41–46, thereby updating all existing TRCs using a single calibration TRC.

Figure 9:
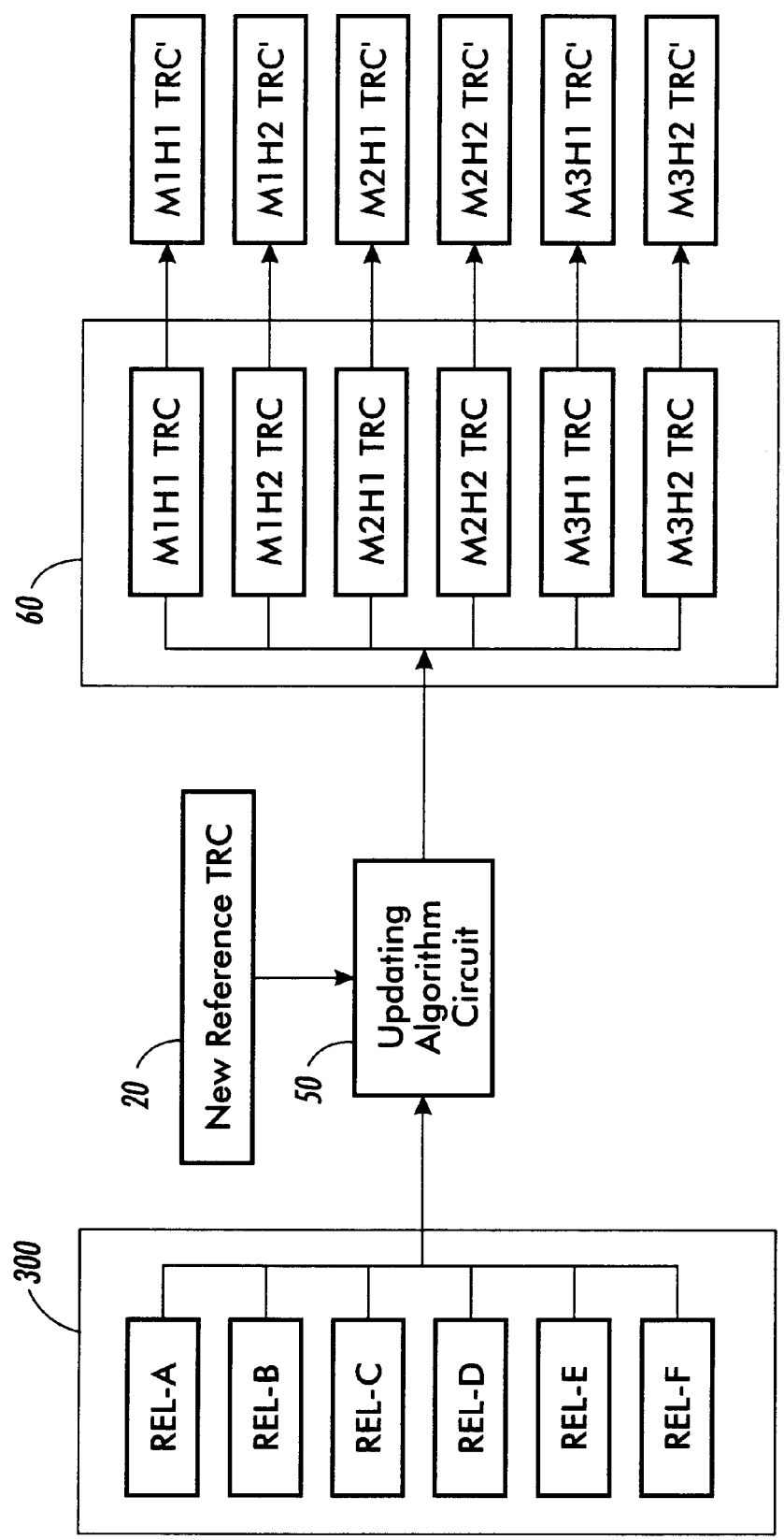
FIG. 9 is a block diagram showing another embodiment of an updating calibration process according to the present invention.

FIG. 9 shows another block diagram of another embodiment of the present invention. In FIG. 9, a reference media/halftone combination TRC 20 along with all the predetermined relationships from a relationship circuit is input to an updating algorithm circuit 50. The algorithm circuit 50 uses the reference media/halftone combination TRC 20 and the predetermined relationships to generate data to correct the existing TRCs in TRC circuit 60, thereby updating all existing TRCs using a single calibration TRC.

In one embodiment a plurality of predetermined stored calibrated tone-reproduction curves are provided, each predetermined stored calibrated tone-reproduction curve corresponding to a distinct media type and halftone type combination. Moreover, a plurality of predetermined relationships between each stored calibrated tone-reproduction curve and a reference media type and reference halftone type combination is provided. A new tone-reproduction curve, corresponding to a reference media type and reference halftone type combination calibration operation, is generated. Each predetermined stored calibrated tone-reproduction curves is updated based on the newly generated tone-reproduction curve corresponding to the reference media type and reference halftone type combination and the plurality of predetermined relationships between each stored calibrated tone-reproduction curve and the reference media type and reference halftone type combination. This updating can be made contingent upon whether there is an actual difference between the newly generated TRC and a predetermined existing TRC.

In another embodiment, a plurality of predetermined stored calibrated tone-reproduction curves are provided, each predetermined stored calibrated tone-reproduction curve corresponding to a distinct media type and halftone type combination. A plurality of predetermined relationships between each stored calibrated tone-reproduction curve corresponding to a first halftone type and a reference media type and first halftone type combination and a plurality of predetermined relationships between each stored calibrated tone-reproduction curve corresponding to a second halftone type and a reference media type and second halftone type combination are provided. A new tone-reproduction curve corresponding to a reference media type and first halftone type combination calibration operation is generated, and each predetermined stored calibrated tone-reproduction curves corresponding to the first halftone type based on the newly generated tone-reproduction curve corresponding to the reference media type and first halftone type combination and the plurality of predetermined relationships between each stored calibrated tone-reproduction curve corresponding to the first halftone type and the reference media type and first halftone type combination is updated. A second new tone-reproduction curve corresponding to a reference media type and second halftone type combination calibration operation is generated, and each predetermined stored calibrated tone-reproduction curves corresponding to the second halftone type based on the newly generated tone-reproduction curve corresponding to the reference media type and second halftone type combination and the plurality of predetermined relationships between each stored calibrated tone-reproduction curve corresponding to the second halftone type and the reference media type and second halftone type combination is updated.

The present invention has been described with reference to the preferred embodiments above. Obviously, modifications and alterations will occur to others upon reading and understanding the preceding detailed description. It is intended that the present invention be construed as including all such modifications and alterations insofar as they come within the scope of the appended claims or the equivalents thereof.

What is claimed is:

1. A method for applying a calibrated tone-reproduction curve to enable printing of image data, comprising the steps of:

(a) providing a plurality of predetermined stored calibrated tone-reproduction curves and a map providing links between calibrated tone-reproduction curves and distinct media type, a stored calibrated tone-reproduction curve being capable of being mapped to more than one media type;

(b) generating a tone-reproduction curve corresponding to a new media type calibration operation;

(c) displaying the generated tone-reproduction curve;

(d) displaying each of the predetermined stored calibrated tone-reproduction curves;

(e) selecting from either the displayed generated tone-reproduction curve or one of the displayed predetermined stored calibrated tone-reproduction curves to be associated with the new media type;

(f) storing the displayed generated tone-reproduction curve when the displayed generated tone-reproduction curve is selected to be associated with the new media type and updating the map to reflect a link between the new media type and the stored generated tone-reproduction curve; and (g) updating the map to reflect a link between the new media type and the selected one of the displayed predetermined stored calibrated tone-reproduction curves when one of the displayed predetermined stored calibrated tone-reproduction curves is selected to be associated with the new media type.

2. The method as claimed in claim 1, wherein said step (d) displays each predetermined stored calibrated tone-reproduction curves sequentially.

3. The method as claimed in claim 1, wherein said step (d) displays all the predetermined stored calibrated tone-reproduction curves simultaneously.

4. The method as claimed in claim 1, wherein said step (e) selects from either the displayed generated tone-reproduction curve or one of the displayed predetermined stored calibrated tone-reproduction curves to be associated with the new media type for a selected job;

said step (f) temporarily stores the displayed generated tone-reproduction curve when the displayed generated tone-reproduction curve is selected to be associated with the new media type and temporarily updates the map to reflect a temporary link between the new media type and the stored generated tone-reproduction curve; and said step (g) temporarily updates the map to reflect a temporary link between the new media type and the selected one of the displayed predetermined stored calibrated tone-reproduction curves when one of the displayed predetermined stored calibrated tone-reproduction curves is selected to be associated with the new media type.

5. A system for applying a calibrated tone-reproduction curve to enable printing of image data, comprising the steps of:

a storage device to store and provide a plurality of predetermined stored calibrated one-reproduction curves and a map providing links between calibrated tone-reproduction curves and distinct media type, a stored calibrated tone-reproduction curve being capable of being mapped to more than one media type;

a calibration circuit to generate a tone-reproduction curve corresponding to a new media type calibration operation;

a display to display the generated tone-reproduction curve and each of the predetermined stored calibrated tone-reproduction curves;

a user interface to enable selecting of either the displayed generated tone-reproduction curve or one of the displayed predetermined stored calibrated tone-reproduction curves to be associated with the new media type; and a processor to cause said storage device to store the displayed generated tone-reproduction curve when the displayed generated tone-reproduction curve is selected to be associated with the new media type and to update the stored map to reflect a link between the new media type and the stored generated tone-reproduction curve;

said processor updating the stored map to reflect a link between the new media type and the selected one of the displayed predetermined stored calibrated tone-reproduction curves when one of the displayed predetermined stored calibrated tone-reproduction curves is selected to be associated with the new media type.

6. The system as claimed in claim 5, wherein said display displays each predetermined stored calibrated tone-reproduction curves sequentially.

7. The system as claimed in claim 5, wherein said display displays all the predetermined stored calibrated tone-reproduction curves simultaneously.

8. The system as claimed in claim 5, wherein said user interface enables selecting from either the displayed generated tone-reproduction curve or one of the displayed predetermined stored calibrated tone-reproduction curves to be associated with the new media type for a selected job;

said processor causes said storage device to temporarily store the displayed generated tone-reproduction curve when the displayed generated tone-reproduction curve is selected to be associated with the new media type and temporarily updates the map to reflect a temporary link between the new media type and the stored generated tone-reproduction curve; and said processor temporarily updates the map to reflect a temporary link between the new media type and the selected one of the displayed predetermined stored calibrated tone-reproduction curves when one of the displayed predetermined stored calibrated tone-reproduction curves is selected to be associated with the new media type.

9. A method for applying a calibrated tone-reproduction curve to enable printing of image data, comprising the steps of:

(a) providing a plurality of predetermined stored calibrated tone-reproduction curves and a map providing links between calibrated tone-reproduction curves and distinct media type, a stored calibrated tone-reproduction curve being capable of being mapped to more than one media type;

(b) generating a tone-reproduction curve corresponding to a new media type calibration operation;

(c) comparing the generated tone-reproduction curve with each of the plurality of predetermined stored calibrated tone-reproduction curves to determine if one of the plurality of predetermined stored calibrated tone-reproduction curves has similar characteristics;

(d) selecting, automatically, the generated tone-reproduction curve to be associated with the new media type when the generated tone-reproduction curve has non-similar characteristics with each of the plurality of predetermined stored calibrated tone-reproduction curves;

(e) selecting, automatically, a predetermined stored calibrated tone-reproduction curve to be associated with the new media type, the selected predetermined stored calibrated tone-reproduction curve having similar characteristics to the generated tone-reproduction curve;

(f) storing the generated tone-reproduction curve and updating the stored map to reflect a link between the new media type and the stored generated tone-reproduction curve when the generated tone-reproduction curve is selected to be associated with the new media type; and (g) updating the stored map to reflect a link between the new media type and the selected one of the predetermined stored calibrated tone-reproduction curves when one of the predetermined stored calibrated tone-reproduction curves is selected to be associated with the new media type.

10. The method as claimed in claim 9, wherein said step (f) temporarily stores the displayed generated tone-reproduction curve when the displayed generated tone-reproduction curve is selected to be associated with the new media type and temporarily updates the map to reflect a temporary link between the new media type and the stored generated tone-reproduction curve; and said step (g) temporarily updates the map to reflect a temporary link between the new media type and the selected one of the displayed predetermined stored calibrated tone-reproduction curves when one of the displayed predetermined stored calibrated tone-reproduction curves is selected to be associated with the new media type.

11. A system for applying a calibrated tone-reproduction curve to enable printing of image data, comprising the steps of:

a storage device to store and provide a plurality of predetermined stored calibrated tone-reproduction curves and a map providing links between calibrated tone-reproduction curves and distinct media type, a stored calibrated tone-reproduction curve being capable of being mapped to more than one media type;

calibration means for generating a tone-reproduction curve corresponding to a new media type calibration operation;

said calibration means comparing the generated tone-reproduction curve with each of the plurality of predetermined stored calibrated tone-reproduction curves to determine if one of the plurality of predetermined stored calibrated tone-reproduction curves has similar characteristics;

said calibration means selecting, automatically, the generated tone-reproduction curve to be associated with the new media type when the generated tone-reproduction curve has non-similar characteristics with each of the plurality of predetermined stored calibrated tone-reproduction curves;

said calibration means selecting, automatically, a predetermined stored calibrated tone-reproduction curve to be associated with the new media type, the selected predetermined stored calibrated tone-reproduction curve having similar characteristics to the generated tone-reproduction curve; and a processor to cause said storage device to store the generated tone-reproduction curve and to update the stored map to reflect a link between the new media type and the stored generated tone-reproduction curve when said calibration means selects the generated tone-reproduction curve to be associated with the new media type;

said processor updating the stored map to reflect a link between the new media type and the selected one of the predetermined stored calibrated tone-reproduction curves when said calibration means selects one of the predetermined stored calibrated tone-reproduction curves to be associated with the new media type.

12. The system as claimed in claim 11, wherein said processor causes said storage device to temporarily store the displayed generated tone-reproduction curve when the displayed generated tone-reproduction curve is selected to be associated with the new media type and temporarily updates the map to reflect a temporary link between the new media type and the stored generated tone-reproduction curve; and said processor temporarily updates the map to reflect a temporary link between the new media type and the selected one of the displayed predetermined stored calibrated tone-reproduction curves when one of the displayed predetermined stored calibrated tone-reproduction curves is selected to be associated with the new media type.

* * * * *